United States Patent
Bae et al.

(10) Patent No.: US 9,890,981 B2
(45) Date of Patent: Feb. 13, 2018

(54) AIR CONDITIONER TO CONTROL UNIFORM TEMPERATURE OF AIR FLOW BLOWN BY A PLURALITY OF INDOOR FANS, AND METHOD OF CONTROLLING THE SAME

(71) Applicant: SAMSUNG ELECTRONICS CO., LTD., Suwon-si (KR)

(72) Inventors: Hyun Jin Bae, Hwaseong-si (KR); Hyoung Seo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 901 days.

(21) Appl. No.: 14/141,629

(22) Filed: Dec. 27, 2013

(65) Prior Publication Data
US 2014/0360212 A1 Dec. 11, 2014

(30) Foreign Application Priority Data
Jun. 10, 2013 (KR) .......................... 10-2013-0065597

(51) Int. Cl.
*F25D 17/04* (2006.01)
*F25D 17/06* (2006.01)
(Continued)

(52) U.S. Cl.
CPC ............. *F25B 49/02* (2013.01); *F24F 1/0007* (2013.01); *F24F 11/008* (2013.01);
(Continued)

(58) Field of Classification Search
CPC .......... F25B 2313/0293; F25B 2600/11; F25B 2600/112; F25B 2600/2513;
(Continued)

(56) References Cited

U.S. PATENT DOCUMENTS 3,959,979 A * 6/1976 Kramer .................. F25B 39/04
165/299
5,203,179 A * 4/1993 Powell ................ F04D 27/0261
62/180
(Continued)

FOREIGN PATENT DOCUMENTS

EP 2604941 A1 * 6/2013 ............... G06F 1/20
WO WO 2012020752 A1 * 2/2012 ............... G06F 1/20

*Primary Examiner* — Frantz Jules
*Assistant Examiner* — Daniel C Comings
(74) *Attorney, Agent, or Firm* — Staas & Halsey LLP

(57) ABSTRACT

A method of controlling an air conditioner including a compressor, an outdoor heat exchanger, an expansion valve and an indoor unit, includes detecting an indoor temperature and an outdoor temperature and checking an indoor load and an outdoor load when an operation command is input, determining an operation frequency of the compressor and a degree of opening of the expansion valve based on the checked indoor load and the outdoor load, driving the compressor at the determined operation frequency and opening the expansion valve to the determined degree of opening, thereby supplying a refrigerant to an indoor heat exchanger having a first cooling panel and a second cooling panel disposed parallel to each other, controlling a rate of rotation of each of the indoor fans based on the operation frequency of the compressor and the degree of opening of the expansion valve.

7 Claims, 10 Drawing Sheets

(51) Int. Cl.
    *F25B 49/02*     (2006.01)
    *F24F 1/00*     (2011.01)
    *F24F 11/00*     (2018.01)

(52) U.S. Cl.
    CPC ..... *F24F 11/0079* (2013.01); *F24F 2001/004* (2013.01); *F25B 2313/0293* (2013.01); *F25B 2500/19* (2013.01); *F25B 2600/11* (2013.01); *F25B 2600/112* (2013.01); *F25B 2600/2513* (2013.01); *F25B 2700/04* (2013.01); *F25B 2700/171* (2013.01); *F25B 2700/2104* (2013.01); *F25B 2700/2106* (2013.01); *Y02B 30/746* (2013.01)

(58) Field of Classification Search
    CPC ............ F25B 2700/04; F25B 2700/171; F25B 2700/2104; F25B 2700/2106; F25B 2700/173; F24F 11/0079
    USPC .................................. 62/404, 407, 408, 419
    See application file for complete search history.

(56) References Cited

U.S. PATENT DOCUMENTS

| | | | | |
|---|---|---|---|---|
| 5,265,434 A * | 11/1993 | Alsenz | ................. | F25B 49/022 62/117 |
| 5,782,101 A * | 7/1998 | Dennis | ..................... | F25B 5/02 62/160 |
| 2008/0083233 A1* | 4/2008 | Song | ..................... | F25B 49/005 62/127 |
| 2009/0032235 A1* | 2/2009 | Sullivan | ................ | F24F 1/0007 165/247 |

\* cited by examiner

AIR CONDITIONER TO CONTROL UNIFORM TEMPERATURE OF AIR FLOW BLOWN BY A PLURALITY OF INDOOR FANS, AND METHOD OF CONTROLLING THE SAME

CROSS-REFERENCE TO RELATED APPLICATIONS

This application claims the benefit of Korean Patent Application No. 10-2013-0065597, filed on Jun. 10, 2013 in the Korean Intellectual Property Office, the disclosure of which is incorporated herein by reference.

BACKGROUND

1. Field

One or more embodiments relate to an air conditioner to control uniform temperature of air blown to an indoor space and a method of controlling the same.

2. Description of the Related Art

An air conditioner uses movement of heat produced during evaporation and condensation of a refrigerant to cool, heat or purify suctioned air and discharge the suctioned air to condition the air in an indoor space.

The air conditioner performs cooling operation of discharging the indoor heat to the outside during summer and performs heating operation of circulating the refrigerant in the reverse cycle of the cooling cycle to supply heat to the indoor space during winter.

Air conditioners may be divided into a split type and an integrated type. In the split type air conditioner, an indoor unit and an outdoor unit are separately installed. In the case of the integrated type air conditioner, the indoor unit and the outdoor unit are installed together in one cabinet. The split type air conditioners may be further divided into a floor standing type and a wall mounted type depending on how the indoor unit is installed.

The indoor unit of the split type air conditioner includes an indoor heat exchanger to cause air suctioned into the panel to be subjected to heat exchange, and an indoor fan to suction indoor air into the body and discharge the suctioned air to the indoor space.

Generally, the indoor unit of the split type air conditioner has the indoor fan disposed at the lower portion thereof and the indoor heat exchanger disposed at the upper portion thereof. In addition, a discharge port to discharge air is formed on one surface of the body of the indoor unit adjacent to the indoor heat exchanger.

Thereby, the air suctioned in by the indoor fan is moved to the upper portion of the indoor unit, and the air moved to the upper portion of the indoor unit is discharged to the indoor space via the indoor heat exchanger and discharge port.

In the case of the indoor unit having the structure as above, the indoor fan and the indoor heat exchanger are vertically arranged. As a result, space utilization of the indoor unit may be poor.

In addition, the air having passed through the indoor fan needs to be moved to the upper portion of the indoor unit to be discharged. Thereby, a long flow path may be formed from the lower portion to the upper portion of the indoor unit, and a large load may be applied to the indoor fan when the indoor fan drives the suctioned air to flow. Thereby, the indoor unit may be inefficient in using energy, and may have a limit in increasing the flow rate and flow speed of air.

Moreover, in the case that the indoor heat exchanger and the indoor fan are arranged in a narrow space to make the indoor unit compact and slim, the air resistance on the indoor heat exchanger may increase, lowering the performance of the indoor fan and increasing noise during operation of the indoor unit.

SUMMARY

The foregoing described problems may be overcome and/or other aspects may be achieved by one or more embodiments of an air conditioner what may include an indoor heat exchanger that may have cooling panels arranged at the front and back of the air conditioner, a refrigerant that may move upward in the cooling panel at the front and may move downward in the cooling panel at the back, a plurality of indoor fans respectively disposed adjacent to the indoor heat exchanger, an expansion valve connected to the indoor heat exchanger, and a controller to control a rate of rotation of each of the indoor fans based on a degree of opening of the expansion valve, and a method of controlling the same.

The foregoing described problems may be overcome and/or other aspects may be achieved by one or more embodiments of an air conditioner to control a rate of rotation of each of indoor fans based on an operation mode, an indoor load, an outdoor load, an operation frequency of a compressor, and a degree of opening of the expansion valve, and a method of controlling the same.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, an air conditioner may include a compressor, an outdoor heat exchanger, an expansion valve and an indoor unit, wherein the indoor unit may include an indoor heat exchanger that may include a first cooling panel, and a second cooling panel disposed parallel with the first cooling panel and connected to a refrigerant outflow port of the first cooling panel to receive a refrigerant supplied from the first cooling panel, a plurality of indoor fans disposed adjacent to the first cooling panel of the indoor heat exchanger and arranged at different positions, a controller to estimate the amount of the refrigerant based on an operation frequency of the compressor and a degree of opening of the expansion valve and to control a rate of rotation of each of the indoor fans based on the amount of the refrigerant.

The indoor unit may further include a housing to accommodate the indoor heat exchanger and the indoor fans, wherein the first cooling panel and second cooling panel of the indoor heat exchanger may be vertically disposed in the housing such that the refrigerant may move in the first cooling panel in a first vertical direction and may move in the second cooling panel in a second vertical direction opposite to the first vertical direction.

The indoor fans may be disposed to face the first cooling panel and may be arranged at different positions having different heights.

The controller may control the rate of rotation of each of the indoor fans such that the rate of rotation of one of the indoor fans disposed at a refrigerant inflow port of the first cooling panel is higher than the rate of rotation of another one of the indoor fans disposed at the refrigerant outflow port of the first cooling panel.

The controller may increases a difference between the rates of rotation of the indoor units in proportion to an increase in a shortage in the amount of the refrigerant.

The air conditioner may further include an input to receive an operation mode input thereto, wherein the controller may check a reference rate of rotation of the indoor fans corresponding to the input operation mode, control one of the indoor fans disposed at a highest position of the different positions of the indoor heat exchanger to rotate at the checked reference rate of rotation, and control rotation of the other ones of the indoor fans such that each of the other indoor units disposed at a lower position of the indoor heat exchanger rotates at a rate of rotation increased from the reference rate of rotation by a predetermined rate of rotation.

In accordance with one or more embodiments, an air conditioner may include a variable capacity compressor, an expansion valve to adjust a flow rate of a refrigerant discharged from the compressor, an outdoor temperature detector to detect a temperature of an outdoor space, an indoor temperature detector to detect a temperature of an indoor space, an indoor heat exchanger including a first cooling panel, and a second cooling panel disposed parallel with the first cooling panel and connected to a refrigerant outflow port of the first cooling panel to receive a refrigerant supplied from the first cooling panel, a plurality of indoor fans disposed adjacent to the first cooling panel of the indoor heat exchanger and arranged at different positions, a controller to determine an operation frequency of the compressor and a degree of opening of the expansion valve based on an outdoor load corresponding to the temperature of the outdoor space and an indoor load corresponding to the temperature of the indoor space and to independently control a rate of rotation of each of the indoor fans based on the operation frequency of the compressor and the degree of opening of the expansion valve.

The first cooling panel may include a plurality of tubes arranged at constant intervals and allowing the refrigerant to simultaneously flow therethrough, the second cooling panel may include a plurality of tubes arranged at constant intervals and allowing the refrigerant to simultaneously flow therethrough, and a flow direction of the refrigerant in the tubes of the first cooling panel may be different from a flow direction of the refrigerant in the tubes of the second cooling panel.

The indoor heat exchanger may further include a header to connect the refrigerant outflow port of the first cooling panel to a refrigerant inflow port of the second cooling panel, wherein the tubes of the second cooling panel may receive the refrigerant transferred from the tubes of the first cooling panel via the header.

The first cooling panel and the second cooling panel may be vertically disposed and arranged on front and rear surfaces of the housing to be parallel with each other, such that the refrigerant flowing in the first cooling panel on the front surface moves from a lower side of the first cooling panel to an upper side of the first cooling panel, and the refrigerant flowing in the second cooling panel or the rear surface moves from an upper side of the second panel to a lower side of the second panel.

The controller may compare the operation frequency of the compressor with a predetermined first reference frequency and a predetermined second reference frequency, and compare the degree of opening of the expansion valve with a predetermined degree of opening to determine the rate of rotation of each of the indoor fans.

Upon determining that the amount of the refrigerant is a normal amount, the controller may control the rate of rotation of the indoor fans to be equal to each other.

The air conditioner may further include an input to receive an operation mode input thereto, wherein the controller may check a flow rate corresponding to the input operation mode, check a reference rate of rotation corresponding to the checked flow rate, set the checked reference rate of rotation as a rate of rotation of an uppermost one of the indoor fans, and control the other ones of the indoor fans based on the checked reference rate of rotation such that each of the other ones of the indoor fans has an increased rate of rotation.

In accordance with one or more embodiments, a method of controlling an air conditioner that may include a compressor, an outdoor heat exchanger, an expansion valve and an indoor unit, may include detecting an indoor temperature and an outdoor temperature and checking an indoor load and an outdoor load when an operation command is input, determining an operation frequency of the compressor and a degree of opening of the expansion valve based on the checked indoor load and the outdoor load, driving the compressor at the determined operation frequency and opening the expansion valve to the determined degree of opening, thereby supplying a refrigerant to an indoor heat exchanger having a first cooling panel and a second cooling panel disposed parallel to each other, controlling a rate of rotation of each of the indoor fans based on the operation frequency of the compressor and the degree of opening of the expansion valve.

The controlling may include adjusting the rate of rotation of each of the indoor fans disposed adjacent to the first cooling panel of the indoor heat exchanger and arranged at different positions, according to the positions, and rotating each of the indoor fans at the adjusted rate of rotation.

The method may further include checking a reference rate of rotation corresponding to an operation mode when the operation mode is input, and controlling the rate of rotation of each of the indoor fans based on the checked reference rate of rotation.

The controlling may include determining whether the operation frequency of the compressor exceeds a first reference frequency, determining whether the degree of opening of the expansion valve exceeds a predetermined degree of opening upon determining that the operation frequency of the compressor exceeds the first reference frequency, and rotating a first indoor fan of the indoor fans located at an uppermost position of the different positions at the reference rate of rotation, a second indoor fan located at a middle position of the different positions at a rate of rotation higher than the reference rate of rotation and a third indoor fan located at a lowermost position of the different positions at a rate of rotation higher than the rate of rotation of the second indoor fan, upon determining that the degree of opening of the expansion valve exceeds the predetermined degree of opening.

The controlling of the rate of rotation of each of the indoor fans may include rotating the first indoor fan at the reference rate of rotation upon determining that the degree of opening of the expansion valve is equal to or lower than the predetermined degree of opening, rotating the second indoor fan at a rate of rotation higher than the reference rate of rotation, and lower than the rate of rotation of the second indoor fan given when the degree of opening of the expansion valve exceeds the predetermined degree of opening, rotating the third indoor fan at a rate of rotation higher than the rate of rotation of the second indoor fan, and lower than the rate of rotation of the third indoor fan given when the degree of opening of the expansion valve exceeds the predetermined degree of opening.

Controlling the rate of rotation of the first indoor fan may include controlling a rate of rotation of the first indoor fan to be lower than the rate of rotation of the first indoor fan given when the operation frequency of the compressor exceeds the first reference frequency, if the operation frequency of the compressor is equal to or higher than a second reference frequency and is equal to or lower than the first reference frequency, controlling the rate of rotation of the second indoor fan may include controlling a rate of rotation of the second indoor fan to be lower than the rate of rotation of the second indoor fan given when the operation frequency of the compressor exceeds the first reference frequency, if the operation frequency of the compressor is equal to or higher than the second reference frequency and is equal to or lower than the first reference frequency, and controlling the rate of rotation of the third indoor fan may include controlling a rate of rotation of the third indoor fan to be lower than the rate of rotation of the third indoor fan given when the operation frequency of the compressor exceeds the first reference frequency, if the operation frequency of the compressor is equal to or higher than the second reference frequency and is equal to or lower than the first reference frequency.

The method may further include determining whether the degree of opening of the expansion valve exceeds the predetermined degree of opening, if the operation frequency of the compressor is equal to or higher than the second reference frequency and is equal to or lower than the first reference frequency, and adjusting a difference between the rates of rotation of the indoor fans depending on whether the degree of opening of the expansion valve exceeds the predetermined degree of opening such that the difference between the rates of rotation is greater when the degree of opening of the expansion valve is equal to or lower than the predetermined degree of opening than when the degree of opening of the expansion valve exceeds the predetermined degree of opening.

The method may further include controlling the rates of the indoor fans to be equal to each other upon determining that the operation frequency of the compressor is lower than the second reference frequency lower than the first reference frequency.

According to one or more embodiments, by adjusting the respective rates of rotation of the indoor fans in consideration of the indoor and outdoor loads and the amount of the refrigerant, the temperature of air discharged from the upper, middle and lower discharge ports may become uniform according to the load and amount of refrigerant during the maximum or minimum load operation.

By making the temperature of the air discharged from the indoor unit uniform, the user using the air conditioner may feel more pleasant and satisfied.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
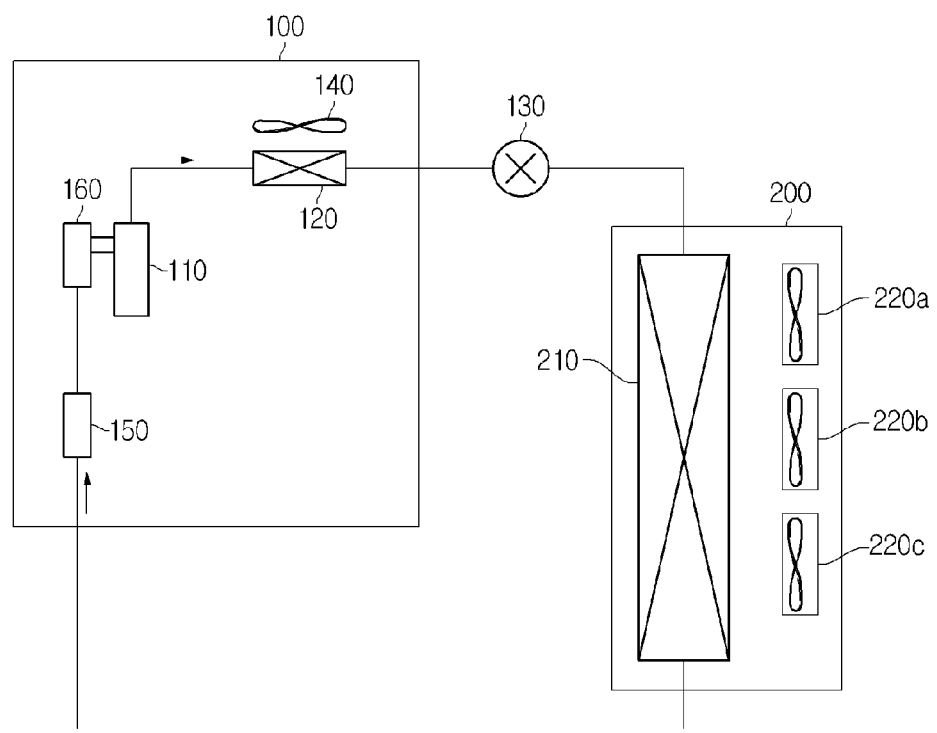
FIG. 1 is a view illustrating a configuration of an air conditioner according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a view illustrating a configuration of an air conditioner according to one or more embodiments. The air conditioner of the illustrated embodiment is a floor standing type air conditioner.

The air conditioner performs at least one of cooling operation of cooling the indoor space and heating operation of heating the indoor space.

In one or more embodiments, a floor standing type air conditioner to perform cooling operation will be exemplarily described.

The floor standing type air conditioner may include an outdoor unit 100 and an indoor unit 200. The air conditioner may further include a controller 300 to control the outdoor unit and the indoor unit. The controller 300 will be described later.

As shown in FIG. 1, the outdoor unit 100 may include a compressor 110, an outdoor heat exchanger 120, an expansion valve 130, an outdoor fan 140, and an accumulator 150. The indoor unit 200 may include an indoor heat exchanger 210 and a plurality of indoor fans 220a, 220b and 220c. Herein, the expansion valve 130 may be disposed at the indoor unit 200.

The indoor unit may include two or more indoor fans. In the illustrated embodiment, three indoor fans will be provided as an example.

The compressor 110 may compress a refrigerant, and may discharge the compressed gaseous refrigerant of high temperature and high pressure to the outdoor heat exchanger 120. Herein, the compressor may be a variable capacity compressor.

The outdoor heat exchanger 120 may be connected to the discharge port of the compressor 110 via a refrigerant pipe. The outdoor heat exchanger 120 may condense the refrigerant introduced thereinto from the compressor 110 by causing the refrigerant to dissipate heat.

That is, the outdoor heat exchanger 120 may function as a condenser during a cooling operation. At this time, the phase of the refrigerant changes from the gaseous state of high temperature and high pressure to the liquid state of high temperature and high pressure.

The expansion valve 130 may be disposed between the outdoor heat exchanger 120 and the indoor heat exchanger 210. Such an expansion valve may be an electronic expansion valve to adjust flow rate of the refrigerant.

The expansion valve 130 may decrease the pressure and temperature of the refrigerant introduced from the outdoor heat exchanger 120 and then may transfer the refrigerant to the indoor heat exchanger 210, thereby possibly facilitating absorption of heat when the refrigerant evaporates.

That is, the refrigerant may change from a liquid state of high temperature and high pressure to another liquid state of high temperature and high pressure as it passes through the expansion valve 130. Herein, the expansion valve may be a capillary tube.

The outdoor fan 140 may be arranged at one side of the outdoor heat exchanger 120. The outdoor fan 140 may promote heat dissipation through rotation of a motor.

The accumulator 150 may be disposed at a suction port of the compressor 110. The accumulator 150 may separate the liquid refrigerant which has not been vaporized while the refrigerant moves from the indoor heat exchanger 210 to the compressor 110, thereby possibly preventing the liquid refrigerant from being transferred to the compressor 110 and possibly preventing damage to the compressor 110.

The indoor heat exchanger 210 of the indoor unit 200 may be disposed at a different location in the housing. The indoor heat exchanger 210 may perform a heat exchange operation by causing the refrigerant introduced thereinto from the expansion valve 130 to absorb heat and thus exchange heat with the indoor air as the refrigerant evaporates. At this time, the phase of the refrigerant may change from the liquid refrigerant of low temperature and low pressure to the gaseous refrigerant of low temperature and low pressure. That is, the indoor heat exchanger 210 may function as an evaporator during cooling operation.

The indoor fans 220a, 220b and 220c may be respectively disposed at different positions at one side of the indoor heat exchanger 210, and may force the air having exchanged heat in the indoor heat exchanger 210 to flow to the indoor space. The indoor fans 220a, 220b and 220c may include mixed-flow fans.

The air conditioner may further include a refrigerant pipe. The refrigerant pipe may connect the compressor 110 to the outdoor heat exchanger 120, the outdoor heat exchanger 120 to the expansion valve 130, the expansion valve 130 to the indoor heat exchanger 210, and the indoor heat exchanger 210 to the accumulator 150.

The indoor unit 200 having mixed-flow indoor fans will be described with reference to FIGS. 2 to 7.

Figure 2:
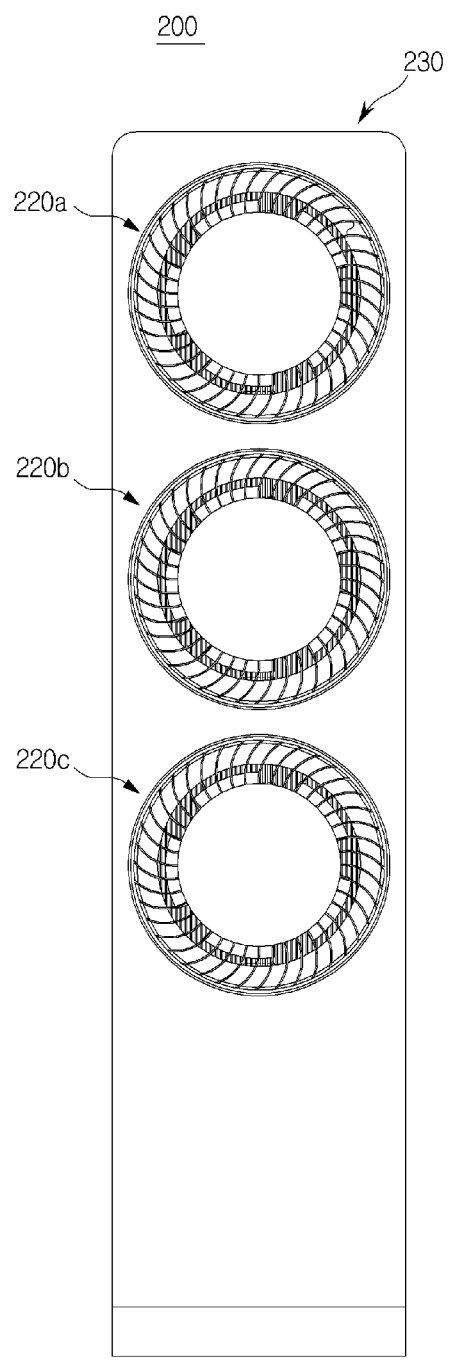
FIG. 2 is a front view showing an indoor unit provided to an air conditioner according to one or more embodiments.
Figure 3:
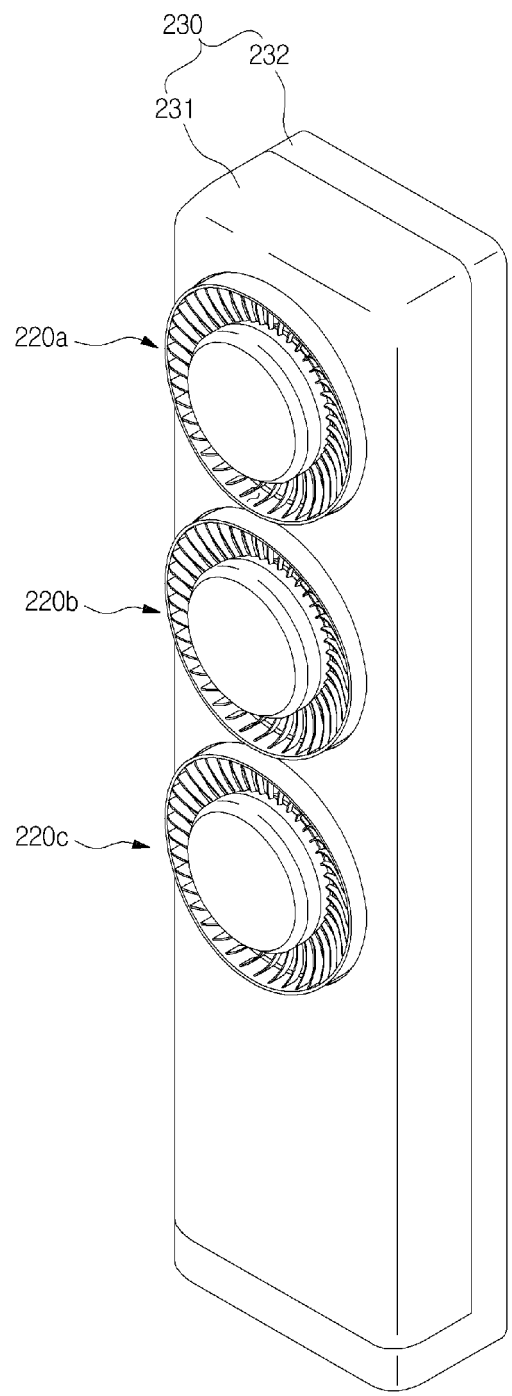
FIG. 3 is a perspective view showing an indoor unit according to one or more embodiments, such as the indoor unit shown in FIG. 2.
Figure 4:
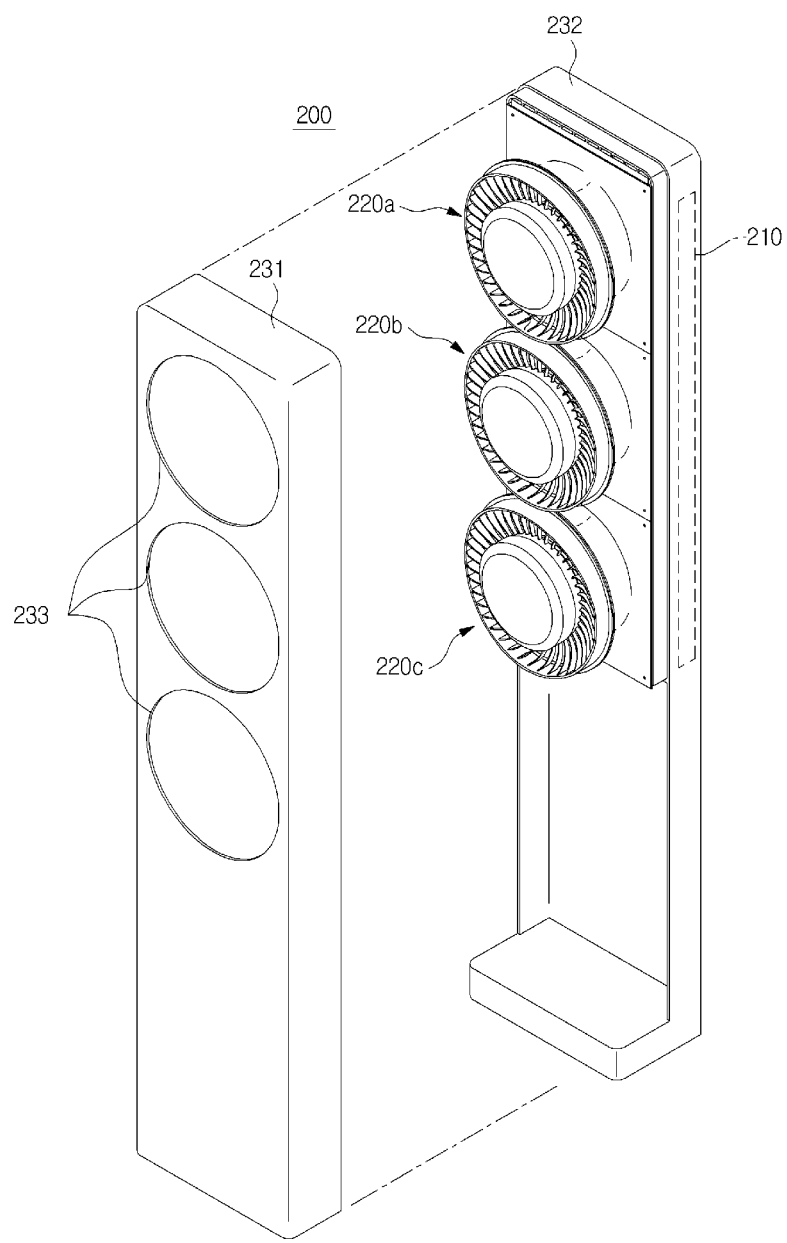
FIG. 4 is view exemplarily showing an indoor unit according to one or more embodiments, such as the indoor unit of FIG. 2, with a front panel separated from the indoor unit.
Figure 5:
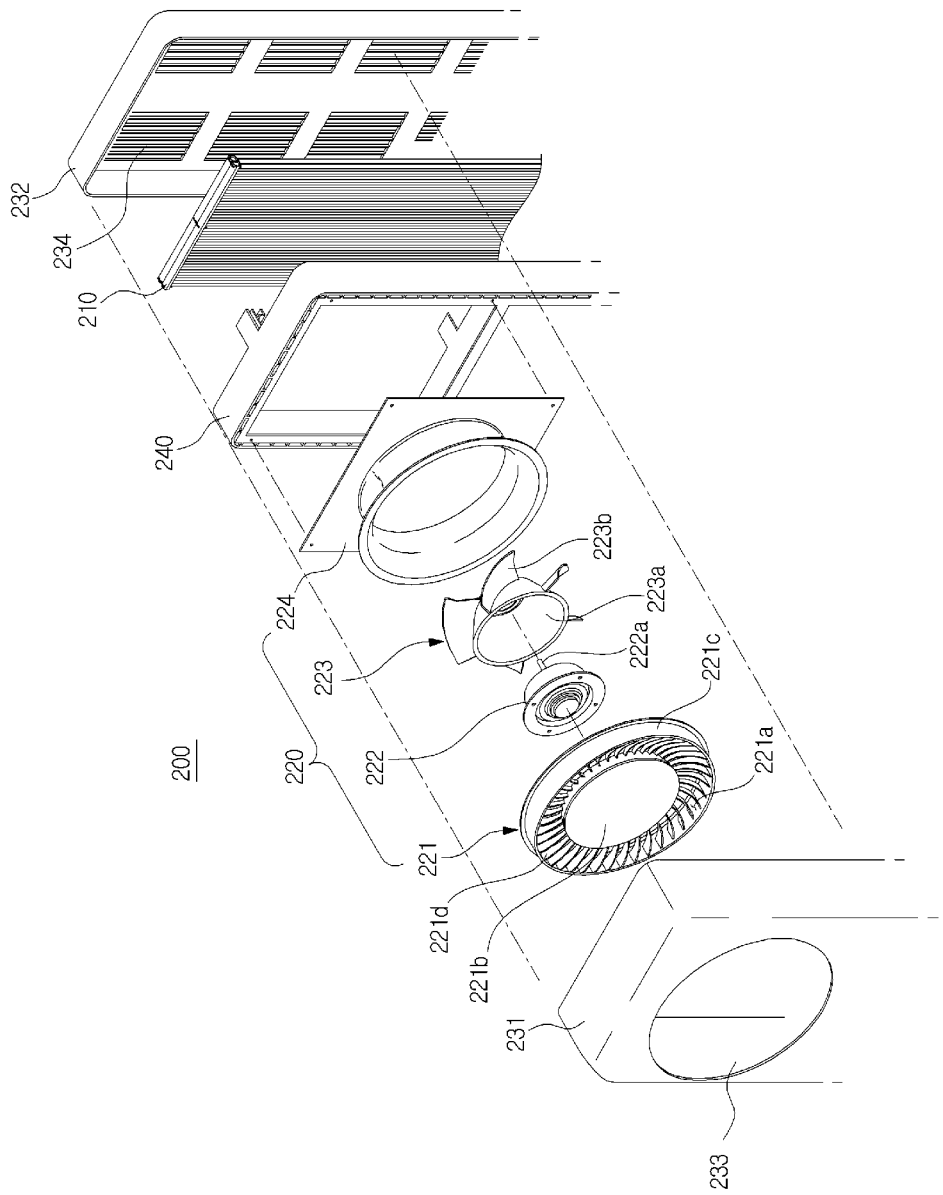
FIG. 5 is an exploded perspective view showing a portion of an indoor unit according to one or more embodiments, such as the indoor unit shown in FIG. 2.
Figure 6:
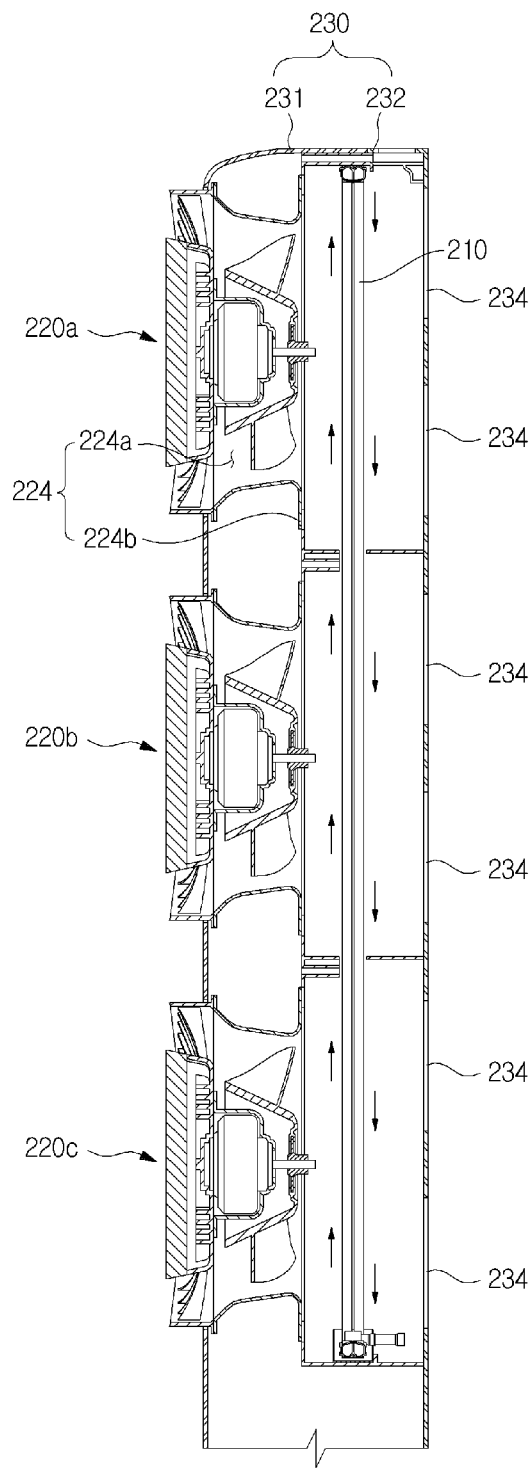
FIG. 6 is a cross-sectional view showing an indoor unit according to one or more embodiments, such as the indoor unit shown in FIG. 2.
Figure 7:
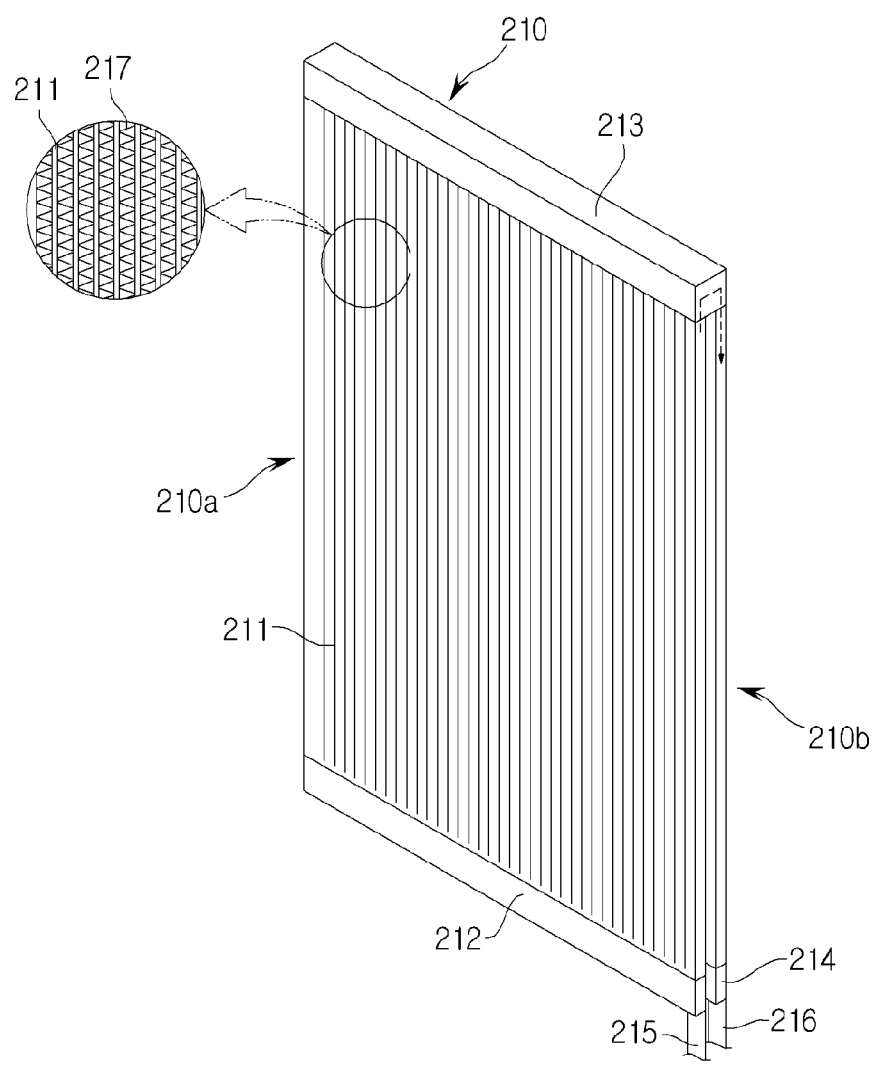
FIG. 7 is a perspective view showing a heat exchanger of an indoor unit provided to an air conditioner according to one or more embodiments.

FIG. 2 is a front view showing an indoor unit provided to an air conditioner according to one or more embodiments. FIG. 3 is a perspective view showing an indoor unit according to one or more embodiments, such as the indoor unit shown in FIG. 2. FIG. 4 is view exemplarily showing an indoor unit according to one or more embodiments, such as the indoor unit of FIG. 2, with a front panel separated from the indoor unit. FIG. 5 is an exploded perspective view showing a portion of an indoor unit according to one or more embodiments, such as the indoor unit shown in FIG. 2. FIG. 6 is a cross-sectional view showing an indoor unit according to one or more embodiments, such as the indoor unit shown in FIG. 2. FIG. 7 is a view exemplarily showing a heat exchanger of an indoor unit provided to an air conditioner according to one or more embodiments.

As shown in FIGS. 2 to 6, the indoor unit 200 of an air conditioner may include a housing 230 forming an external appearance of the indoor unit 200. An indoor heat exchanger and a plurality of indoor fans may be accommodated in the housing 230. The housing 230 may include a front panel 231 and a rear panel 232, which may be separably coupled to each other.

The front panel 231 of the housing 230 may be provided with a plurality of openings 233 through which air may be discharged by the indoor fans. The openings 233 may have a circular shape, and at least two of the openings 233 may be disposed spaced from each other in, for example, a vertical direction of the front panel 231.

The openings 233 of the front panel 231 may allow some portions of the indoor fans 220a, 220b and 220c to be exposed forward.

The housing 230 may be provided therein with an indoor heat exchanger 210 that may be disposed adjacent to the rear panel, and a plurality of mixed-flow indoor fans 220a, 220b and 220c that may be disposed at different positions of the front of the indoor heat exchanger 210. A plurality of suction ports 234 may be formed on the rear surface of the housing 230.

Herein, a description will be exemplarily given of the case of the indoor fans 220a, 220b and 220c and the suction ports 234 disposed at the upper, middle and lower portions of the indoor unit 200 in the longitudinal direction of the indoor unit 200.

The plurality of indoor fans may include a first indoor fan 220a, a second indoor fan 220b, and a third indoor fan 220c, disposed spaced from each other at the upper, middle and lower portions of the indoor unit 200 in the longitudinal direction of the indoor unit 200.

The first indoor fan 220a, the upper portion of the indoor heat exchanger 210, and the upper portion of the suction port 234 may be disposed in a row to be parallel with each other. The second indoor fan 120b, the middle portion of the indoor heat exchanger 220, and the middle portion of the suction port 234 may be disposed in a row to be parallel with each other. The third indoor fan 220c, the lower portion of the indoor heat exchanger 210, and the lower portion of the suction port 234 may be disposed in a row to be parallel with each other.

The indoor fans 220a, 220b and 220c may all have the same structure, and thus the first indoor fan 220a of the indoor fans 220a, 220b and 220c will be described as an example.

The indoor fan 220a may include a diffuser 221, a motor 222 coupled to the rear surface of the diffuser 221, a blade member 223 rotatably coupled to the motor 222, and a duct 224 coupled to the rear surface of the diffuser 221 to form a path allowing air suctioned in by the blade member 223 to move therethrough during discharge of the air.

The diffuser 221 may include a ring-shaped discharge port 221a, a circular disc plate 221b, and a circular grille 221c coupled to the outer circumferential surface of the disc plate 221b. Herein, the discharge port 221a may be defined between the disc plate 221b and the grille 221c.

The diffuser 221 may be disposed at the front of the blade member 223 to possibly allow the air having passed through the blade member 223 to be discharged forward from the front panel 231 through the discharge port 221a.

The grille 221c may include at least one blade plate 221d. The number, shape and orientation of the blade plates 221d may be changed to adjust the flow direction and flow rate of air discharged through the discharge port 221a.

In addition, the direction and flow rate of air discharged through the discharge port 221a may be adjusted by decreasing or increasing the radial width of the discharge port 221a through adjustment of the distance between the disc plate 221b and the grille 221c, or by adjusting the diameter of the disc plate 221b.

The motor 222 may be coupled to the rear surface of the disc plate 221b such that the rotating shaft 222a thereof may be arranged in the direction toward the rear panel 232. The motor 222 may drive the blade member 223 to rotate.

The blade member 223 may be disposed between the diffuser 221 and the indoor heat exchanger 210 to suction in the air having been heat-exchanged in the indoor heat exchanger 210 and discharge the air through the discharge port 221a. The blade member 223 may include a hub 223a coupled to the rotating shaft 222a of the motor 222, and a plurality of blades 223b coupled to the outer circumferential surface of the hub 223a.

The diameter of the hub 223a may gradually decrease in the direction in which the rotating shaft 222a of the motor 222 faces, i.e., toward the rear panel 232. Thereby, the outer circumferential surface of the hub 223a may be inclined.

Three or more blades 223b may be disposed equally spaced from each other along the outer circumferential surface of the hub 223a. While rotating together with the hub 223a, the blades 223b may create a pressure gradient in the front-back direction of the blade member 223 to form a uniform air flow.

The duct 224 may include a flow path defining pipe 224a that may be formed in a circular shape surrounding the blade member 223 to define an air flow path allowing the air suctioned in by the air the blade member 223 to flow to the discharge port 221a therethrough, and a fixing plate 224b that may be connected to the rear side of the flow path defining pipe 224a to fix the duct 224 to the inside of the housing 230.

The lateral surface of the flow path defining pipe 224a may be inclined to cause the air suctioned in by the hub 223a and the blade member 223 to be discharged in an inclined direction toward the discharge port 221a.

The diffuser 221 may be coupled and fixed to the front surface of the inlet of the flow path defining pipe 224a. The duct 224 may be coupled and fixed to the fixing frame 240 through the fixing plate 224b that may be formed in a rectangular shape.

The suction port 234 may be provided to the rear panel 232 disposed at the rear side of the indoor heat exchanger 210 to guide air outside of the indoor unit 200 into the indoor unit 200.

Similar to the indoor heat exchanger 210, one or more suction ports 234 may be provided on the rear panel 232.

The air flowing into the housing 230 through the suction port 234 may absorb or lose heat via the indoor heat exchanger 210. Having been subjected to heat exchange via the indoor heat exchanger 210, the air may be suctioned in and discharged from the housing 230 through the duct 224 and the discharge port 221a by the blade member 223.

The indoor heat exchanger 210 may be disposed between the indoor fan 220 and the suction port 234 to absorb heat from the air suctioned in through the suction port 234 or to transfer heat to the air suctioned in through the suction port 234.

The indoor heat exchanger 210 may be one heat exchanger having a size corresponding to the combined size of the indoor fans 220a, 220b and 220c.

As shown in FIG. 7, the indoor heat exchanger 210 may include a first cooling panel 210a disposed on the front surface of the indoor heat exchanger 210, and a second cooling panel 210b disposed on the rear surface of the indoor heat exchanger 210. One side of the first cooling panel 210a may be mechanically connected to one side of the second cooling panel 210b.

The first cooling panel 210a and the second cooling panel 210b may have the same structure. Each of the first cooling panel 210a and the second cooling panel 210b may include a plurality of tubes 211 arranged in a row and spaced a constant distance from each other, a first header 212 coupled to the inlet ports of the tubes 211 to simultaneously supply refrigerant to the tubes, a second header 213 to connect the outlet of the first cooling panel 210a to the inlet of the second cooling panel 210b, and a third header 214 coupled to the outlet port of the second cooling panel 210b to simultaneously receive the refrigerant discharged through the outlets of the tubes.

The indoor heat exchanger 210 may further include an inflow pipe 215 to supply refrigerant to the first header 212 of the first cooling panel 210a, and an outflow pipe 216 to receive the refrigerant from the third header 214 of the second cooling panel 210b.

That is, the first cooling panel 210a may guide the refrigerant introduced thereinto from the lower side to the upper side. The second cooling panel 210b may guide the refrigerant introduced thereinto from the upper side to the lower side. As described above, the directions of movement of the refrigerant in the first cooling panel 210a and the second cooling panel 210b may be opposite to each other.

Each of the first cooling panel 210a and second cooling panel 210b of the indoor heat exchanger 210 may further include a cooling fin 217 disposed between the tubes to possibly enhance cooling operation.

In the indoor heat exchanger, flow of the refrigerant may be formed as the refrigerant is supplied to the header 212 via the inflow pipe 215, and then simultaneously supplied from the first header 212 to the tubes 211 of the first cooling panel 210a. At this time, the refrigerant may move from the lower side of the first cooling panel 210a to the upper side thereof.

In addition, the refrigerant in the tubes 211 of the first cooling panel 210a may move to the second header 213. The refrigerant in the second header 213 may simultaneously move to the tubes of the second cooling panel 210b. The refrigerant in the tubes of the second cooling panel 210b may move to the third header 214. At this time, the refrigerant may move from the upper side of the second cooling panel 210b to the lower side thereof.

The refrigerant in the third header 214 may move to an external compressor via the outflow pipe 216.

Figure 8:
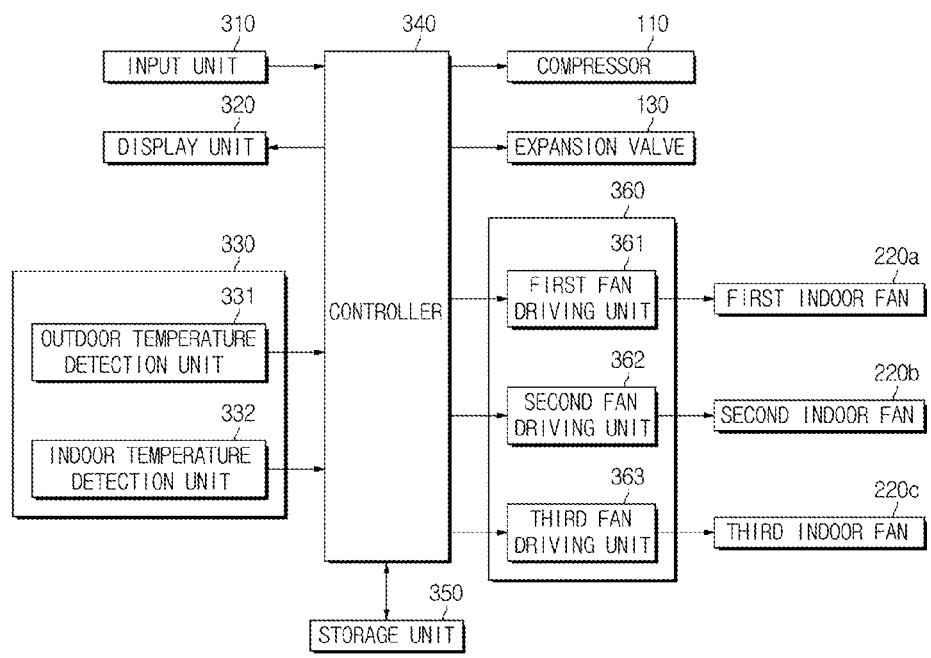
FIG. 8 is a control block diagram illustrating an air conditioner according to one or more embodiments.

FIG. 8 is a control block diagram illustrating an air conditioner according to one or more embodiments, which may include an input 310, a display 320, a detector 330, a controller 340, a storage 350 and a fan driver 360. According to one or more embodiments, the controller 340 may be implemented, for example, by a system on chip (SoC) including modules to perform an algorithm, or a processor to perform a program describing the algorithm, etc.

The input 310 may receive commands from a user. The input 310 may receive commands such as, for example, power on/off, indoor target temperature, and operation modes.

Herein, the operation modes may include flow rate modes to determine a flow rate at which air is to be blown through the indoor fans. For example, the flow rate modes may include a turbo mode, a high mode, a middle mode, and a low mode.

The display 320 may output operational information about the air conditioner. Herein, operational information may include, for example, power on/off, indoor target temperature, and operation modes.

The detector 330 may detect the indoor load and outdoor load. The detector 330 may include an outdoor temperature detector 331 to detect an outdoor temperature, and an indoor temperature detector 332 to detect an indoor temperature.

The controller 340 may check the outdoor load corresponding to the detected outdoor temperature and the indoor load corresponding to the detected indoor temperature, and then may determine the operation frequency of the compressor and the degree of opening of the expansion valve based on the checked outdoor load and indoor load. Then, the controller 340 may control the compressor to operate the compressor at the determined operation frequency, and may adjust the degree of opening of the expansion valve to open the expansion valve to the determined degree of opening.

The controller 340 may check the operation frequency of the compressor 110 and the degree of opening of the expansion valve 130 to control the rates of rotation of the first indoor fan 220a, second indoor fan 220b and third indoor fan 220c. That is, the controller 340 may control the rates of rotation of the first indoor fan 220a, second indoor fan 220b and third indoor fan 220c respectively based on the checked operation frequency of the compressor and degree of opening of the expansion valve.

At this time, an increase in the operation frequency of the compressor and degree of opening of the expansion valve may indicate that the amount of the refrigerant is insufficient for the refrigeration cycle. As the insufficiency of the refrigerant increases, the difference in temperature between the upper and lower sides of the indoor heat exchanger may increase.

Thereby, the controller 340 may control the indoor fans to rotate at different rates of rotation based on the positional relationship between the indoor heat exchanger and the indoor fans such that the temperature of air blown through the indoor fan may become constant.

That is, the first indoor fan, second indoor fan and third indoor fan may be disposed adjacent to the first cooling panel of the indoor heat exchanger which may be vertically disposed, and may be vertically arranged respectively at the upper, middle and lower sides of the indoor heat exchanger.

When the rate of rotation of the first indoor fan disposed at the upper side of the indoor heat exchanger is taken as a reference rate of rotation, the rate of rotation of the second indoor fan disposed below the first indoor fan may be controlled to be higher than that of the first indoor fan, the rate of rotation of the third indoor fan positioned below the second indoor fan may be controlled to be higher than that of the second indoor fan.

By allowing an indoor fan at a lower position of the indoor heat exchanger to have a higher rate of rotation than another one at a higher position, a larger amount of external air may be mixed with the air blown by the indoor fans to increase the temperature of air having been subjected to heat exchange.

That is, by controlling the rates of rotation of the indoor fans to be different from each other according to a difference in temperature between the upper and lower sides of the indoor heat exchanger, the air discharged through the indoor fans may be prevented from having different temperatures.

The storage 350 may store therein a first reference frequency and a second reference frequency of the compressor 110 to control the rates of rotation of the first indoor fan 220a, second indoor fan 220b and third indoor fan 220c, a predetermined degree of opening of the expansion valve 130, and the rates of rotation of the first indoor fan 220a, second indoor fan 220b and third indoor fan 220c corresponding to the operation frequency of the compressor 110 and the degree of opening of the expansion valve 130.

The fan driver 360 may include a first fan driver 361 to drive the motor 222a of the first indoor fan 220a according to commands from the controller 340, a second fan driver 362 to drive the motor 222a of the second indoor fan 220b, and a third fan driver 363 to drive the motor 222a of the third indoor fan 220c.

Figure 9A:
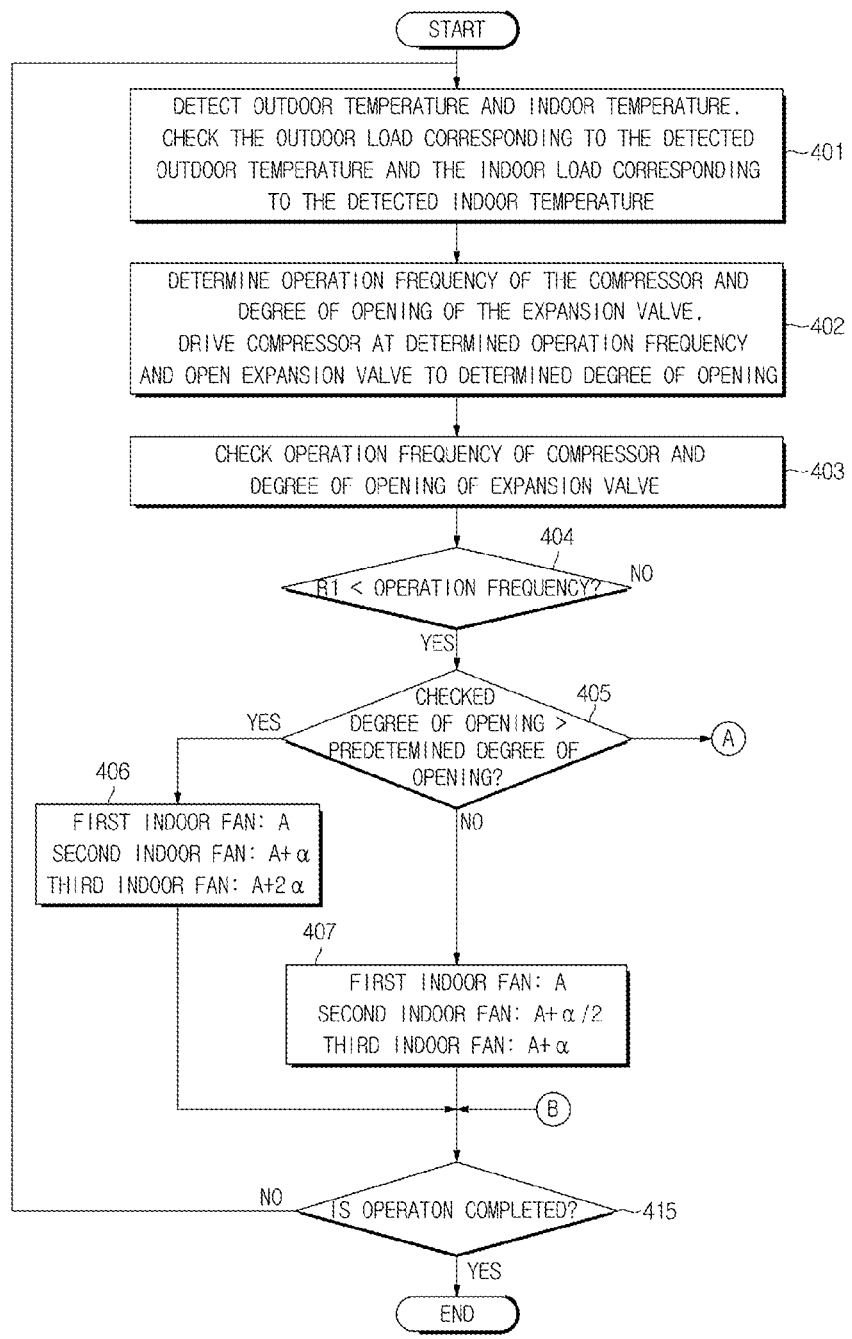
FIG. 9A and FIG. 9B are a control flowchart illustrating a method of controlling an air conditioner according to one or more embodiments.
Figure 9B:
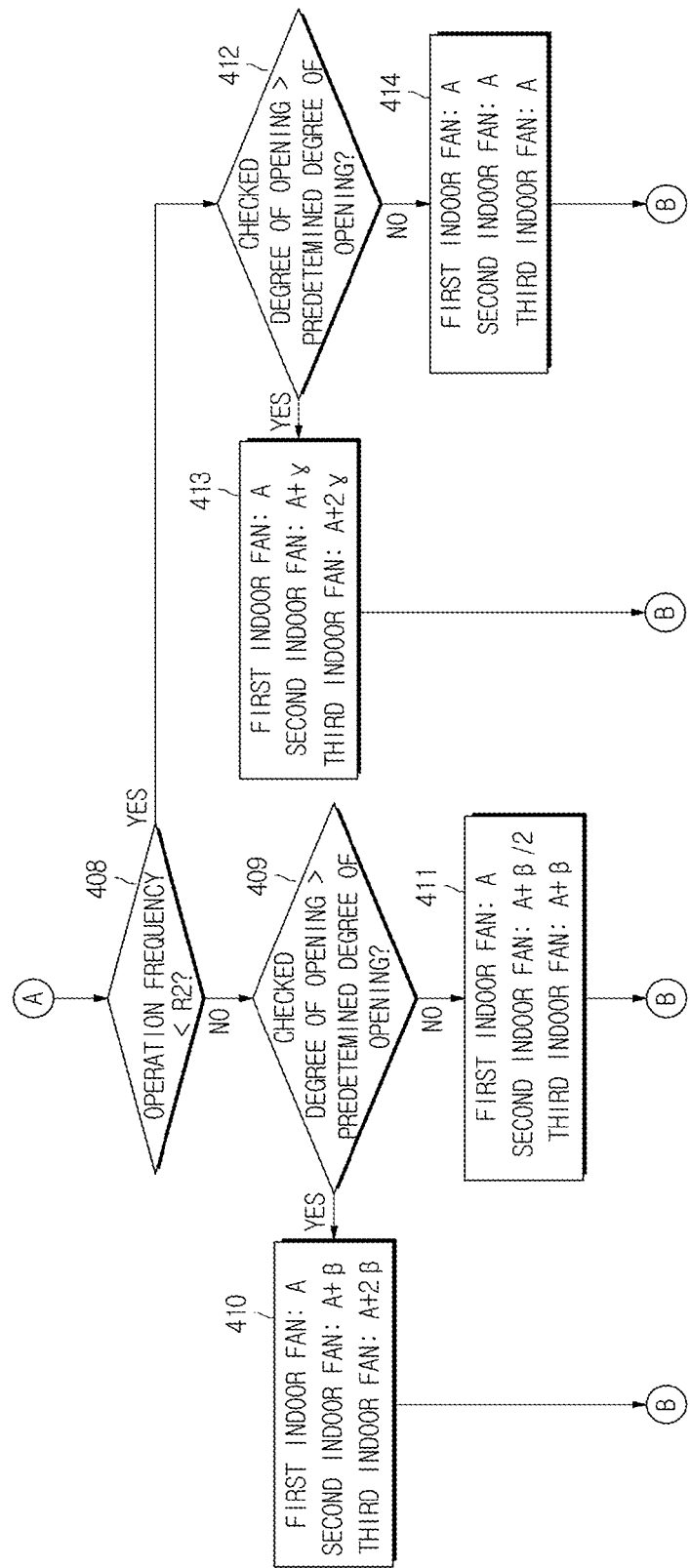

FIG. 9A and FIG. 9B are a control flowchart illustrating a method of controlling an air conditioner according to one or more embodiments.

An air conditioner may determine whether a command to start operation has been input through the input 310 of the indoor unit or a remote control. Upon determining that the command to start operation has been input, the air conditioner may detect the outdoor temperature using the outdoor temperature detector 331, and may detect the indoor temperature using the indoor temperature detector 332.

Next, the air conditioner may check the outdoor load corresponding to the detected outdoor temperature and the indoor load corresponding to the detected indoor temperature (401), and then the air conditioner may determine the operation frequency of the compressor and the degree of opening of the expansion valve based on the checked outdoor load and indoor load. Then, the air conditioner may control the compressor to operate the compressor at the determined operation frequency, and may adjust the degree of opening of the expansion valve to open the expansion valve to the determined degree of opening (402).

Next, the air conditioner may check the determined operation frequency of the compressor and degree of opening of the expansion valve in order to possibly make constant the temperature of air blown through the first indoor fan 220a, second indoor fan 220b and third indoor fan 220c (403).

Next, the air conditioner may determine whether the operation frequency of the compressor exceeds the first reference frequency R1 (404). Upon determining that the operation frequency of the compressor exceeds a first reference frequency R1, the air conditioner may determine whether the checked degree of opening of the expansion valve exceeds a predetermined degree of opening (405). Upon determining that the checked degree of opening of the expansion valve exceeds the predetermined degree of opening, it may be determined that the amount of refrigerant is insufficient for the refrigeration cycle.

Next, the air conditioner may check the flow rate corresponding to the operation mode, and may check the reference rate of rotation of the first indoor fan corresponding to the flow rate. Then, the air conditioner may rotate the first indoor fan at the reference rate of rotation (A), may rotate the second indoor fan at a rate of rotation (A+α) higher than the rate of rotation of the first indoor fan and may rotate the third indoor fan at a rate of rotation (A+2α) higher than the rate of rotation of the second indoor fan (406).

Herein, the reference rate of rotation A may be a rate of rotation predetermined depending on whether the flow rate indicating the operation mode corresponds to, for example, turbo mode, high mode, middle mode, or low mode.

That is, the first indoor fan, located at a higher position than the other indoor fans, at the upper side of the indoor heat exchanger may be rotated at the lowest rate of rotation, and the third indoor fan, located at a lower position than the other indoor fans, at the lower side of indoor heat exchanger may be rotated at the highest rate of rotation. Thereby, compared to the first indoor fan and second indoor fan, the third indoor fan may have the largest amount of indoor air mixed and introduced thereinto such that the temperature of the air blown through the third indoor fan may increase.

On the other hand, upon determining that the checked degree of opening of the expansion valve is equal to or lower than the predetermined degree of opening, it may be determined that the refrigerant is insufficient for the refrigeration cycle. Then, the first indoor fan may be rotated at the reference rate of rotation (A), the second indoor fan may be rotated at a rate of rotation (A+α/2) higher than the rate of rotation of the first indoor fan and the third indoor fan may be rotated at a rate of rotation (A+α) higher than the rate of rotation of the second indoor fan (407).

That is, the first indoor fan, located at a higher position than the other indoor fans, at the upper side of the indoor heat exchanger may be rotated at the lowest rate of rotation, and the third indoor fan, located at a lower position than the other indoor fans, at the lower side of indoor heat exchanger may be rotated at the highest rate of rotation. Thereby, compared to the first indoor fan and second indoor fan, the third indoor fan may have the largest amount of indoor air mixed and introduced thereinto such that the temperature of the air flow blown through the third indoor fan may increase.

Given the same operation frequency of the compressor, the difference in rate of rotation among the first indoor fan, second indoor fan and third indoor fan in the case of having the degree of opening of the expansion valve exceeding the predetermined degree of opening of the expansion valve may be set to be larger than the difference in rate of rotation in the case of having the degree of opening of the expansion valve equal to or lower than the predetermined degree of opening.

That is, given the same operation frequency of the compressor, a higher degree of opening of the expansion valve may indicate that the insufficiency in the amount of the refrigerant is higher than in a lower degree of opening of the expansion valve. Thereby, in the case that the amount of the refrigerant is insufficient to a greater extent, the difference in temperature between the upper and lower sides of the indoor heat exchanger may be larger than in the case that the amount of the refrigerant is insufficient to a lesser extent. Therefore, the difference in rate of rotation among the first indoor unit, second indoor unit and third indoor fan may be increased.

On the other hand, when the insufficiency in the amount of the refrigerant indicates that the difference in temperature between the upper and lower sides of the indoor heat exchanger is smaller than in the case that the insufficiency in the amount of the refrigerant is high. Therefore, by decreasing the difference in rate of rotation among the first indoor unit, second indoor unit, and third indoor fan, the temperature of air discharged through the first indoor unit, second indoor unit, and third indoor fan may become uniform.

The air conditioner may determine whether the operation frequency of the compressor exceeds the first reference frequency R1 (404). Upon determining that the operation frequency of the compressor is equal to or lower than the first reference frequency R1, the air conditioner may determine whether the operation frequency of the compressor is lower than the second reference frequency R2 (408). Upon determining that the operation frequency of the compressor is equal to or higher than the second reference frequency R2, i.e., upon determining that the operation frequency of the compressor is equal to or greater than the second reference frequency and is equal to or lower than the first reference frequency, the air conditioner may determine whether the checked degree of opening of the expansion valve exceeds the predetermined degree of opening (409). Herein, the first reference frequency may be higher than the second reference frequency.

Upon determining that the checked degree of opening of the expansion valve exceeds the predetermined degree of opening, the air conditioner may determine that the amount of refrigerant is insufficient for the refrigeration cycle. Then, the air conditioner may rotate the first indoor fan at the reference rate of rotation (A), the second indoor fan at a rate of rotation (A+β) higher than the rate of rotation of the first indoor fan, and the third indoor fan at a rate of rotation (A+2β) higher than the rate of rotation of the second indoor fan (410). Herein, the rate of rotation β added to the reference rate of rotation may be lower than the rate of rotation α.

In this case, the first indoor fan, located at a higher position than the other indoor fans, at the upper side of the indoor heat exchanger may be rotated at the lowest rate of rotation, and the third indoor fan, located at a lower position than the other indoor fans, at the lower side of the indoor heat exchanger may be rotated at the highest rate of rotation. Thereby, compared to the first indoor fan and second indoor fan, the third indoor fan may have the largest amount of indoor air mixed and introduced thereinto such that the temperature of the air blown by the third indoor fan may increase.

On the other hand, upon determining that the checked degree of opening of the expansion valve is equal to or lower than the predetermined degree of opening, it may be determined that the refrigerant is insufficient to a lesser extent for the refrigeration cycle. Then, the first indoor fan may be rotated at the reference rate of rotation (A), the second indoor fan may be rotated at a rate of rotation (A+β/2) higher than the rate of rotation of the first indoor fan and the third indoor fan may be rotated at a rate of rotation (A+β) (411).

At this time, the first indoor fan, located at a higher position than the other indoor fans, at the upper side of the indoor heat exchanger may be rotated at the lowest rate of rotation, and the third indoor fan, located at a lower position than the other indoor fans, at the lower side of indoor heat exchanger may be rotated at the highest rate of rotation. Thereby, compared to the first indoor fan and second indoor fan, the third indoor fan may have the largest amount of indoor air mixed and introduced thereinto such that the temperature of the air flow blown by the third indoor fan may increase.

Herein, a low operation frequency of the compressor may indicate that the amount of the refrigerant in the refrigeration cycle is larger than in the case of a high operation frequency of the compressor.

The insufficient amount of the refrigerant may indicate that the difference in temperature between the upper and lower sides of the indoor heat exchanger may be smaller than in the case that the amount of the refrigerant is insufficient to a greater extent. Therefore, by decreasing the difference in rate of rotation among the first indoor unit, second indoor unit, third indoor fan, the temperature of air discharged through the first indoor unit, second indoor unit, and third indoor fan may become uniform.

The air conditioner may determine whether the operation frequency of the compressor is lower than the second reference frequency R2 (408). Upon determining that the operation frequency of the compressor is lower than the second reference frequency R2, The air conditioner may determine whether the checked degree of opening of the expansion valve exceeds the predetermined degree of opening (412).

Upon determining that the checked degree of opening of the expansion valve exceeds the predetermined degree of opening, the air conditioner may determine that the amount of the refrigerant in the refrigeration cycle is substantially normal. Then, the air conditioner may rotate the first indoor fan at the reference rate of rotation (A), the second indoor fan at a rate of rotation (A+γ) higher than the rate of rotation of the first indoor fan, and the third indoor fan at a rate of rotation (A+2γ) higher than the rate of rotation of the second indoor fan (413). Herein, the rate of rotation γ added to the reference rate of rotation may be lower than the rate of rotation β.

In this case, the first indoor fan, located at a higher position than the other indoor fans, at the upper side of the indoor heat exchanger may be rotated at the lowest rate of rotation, and the third indoor fan, located at a lower position than the other indoor fans, at the lower side of indoor heat exchanger may be rotated at the highest rate of rotation. Thereby, compared to the first indoor fan and second indoor fan, the third indoor fan may have the largest amount of external air mixed and introduced thereinto such that the temperature of the air flow blown through the third indoor fan may increase.

On the other hand, upon determining that the checked degree of opening of the expansion valve is equal to or lower than the predetermined degree of opening, it may be determined that a sufficient amount of the refrigerant is in the refrigeration cycle. Then, the first indoor fan, second indoor fan and third indoor fan may all be rotated at the reference rate of rotation (A) (414).

That is, a sufficient amount of the refrigerant in the refrigeration cycle may indicate that the difference in temperature between the upper and lower sides of the indoor heat exchanger is very small. Therefore, even when the indoor fans are rotated at the same rate of rotation, air of the same temperature may be supplied.

In controlling the respective rates of rotation of the first indoor fan, second indoor fan, and third indoor fan, based on the operation frequency of the compressor and the degree of opening of the expansion valve, the air conditioner may determine whether an operation termination command has been input (415). Upon determining that the operation termination command has not been input, the air conditioner may repeat the operations 401 to 414. Upon determining that the operation termination command has been input, the air conditioner may terminate the operation.

As is apparent from the above description, by adjusting the respective rates of rotation of the indoor fans in consideration of the indoor and outdoor loads and the amount of the refrigerant as above, the temperature of air discharged from the upper, middle and lower discharge ports may become uniform according to the load and amount of refrigerant during the maximum or minimum load operation.

In addition, by making the temperature of the air discharged from the indoor unit uniform, the user using the air conditioner may feel more pleasant and satisfied.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An air conditioner to control uniform temperature of air flow blown by a plurality of indoor fans, the air conditioner comprising:
   a compressor having variable capacity;
   an expansion valve to adjust a flow rate of a refrigerant discharged from the compressor;
   an outdoor temperature detector to detect a temperature of an outdoor space;
   an indoor temperature detector to detect a temperature of an indoor space;
   an indoor heat exchanger disposed adjacent to the plurality of indoor fans;
   a storage to store information of an operation frequency of the compressor and a degree of opening of the expansion valve corresponding to an indoor load and an outdoor load;
   wherein the plurality of indoor fans are arranged at different positions; and
   a controller to:
      check an outdoor load corresponding to the detected temperature of the outdoor space, to check an indoor load corresponding to the detected temperature of the indoor space,
      determine the operation frequency of the compressor and the degree of opening of the expansion valve based on the checked outdoor load, checked indoor load and the information stored in the storage, and
      independently control a rate of rotation of each indoor fan among the plurality of indoor fans based on the determined operation frequency of the compressor and the determined degree of opening of the expansion valve.

2. The air conditioner according to claim 1, wherein:
   the indoor heat exchanger comprises a first cooling panel, and a second cooling panel disposed parallel with the first cooling panel and connected to a refrigerant outflow port of the first cooling panel to receive a refrigerant supplied from the first cooling panel,
   the first cooling panel comprises a plurality of tubes arranged at constant intervals and allowing the refrigerant to simultaneously flow therethrough;
   the second cooling panel comprises a plurality of tubes arranged at constant intervals and allowing the refrigerant to simultaneously flow therethrough; and
   a flow direction of the refrigerant in the plurality of the tubes of the first cooling panel is different from a flow direction of the refrigerant in the plurality of the tubes of the second cooling panel.

3. The air conditioner according to claim 2, wherein the indoor heat exchanger further comprises a header to connect the refrigerant outflow port of the first cooling panel to a refrigerant inflow port of the second cooling panel,
   wherein the plurality of the tubes of the second cooling panel receive the refrigerant transferred from the tubes of the first cooling panel via the header.

4. The air conditioner according to claim 2, wherein
   the first cooling panel and the second cooling panel are vertically disposed and arranged on a front surface and a rear surface of a housing to be parallel with each other, such that the refrigerant flowing in the first cooling panel on the front surface moves from a lower side of the first cooling panel to an upper side of the first cooling panel, and the refrigerant flowing in the second cooling panel or the rear surface moves from an upper side of the second panel to a lower side of the second panel.

5. The air conditioner according to claim 4, wherein the controller compares the operation frequency of the compressor with a predetermined first reference frequency and a predetermined second reference frequency, and compares the degree of opening of the expansion valve with a predetermined degree of opening to determine the respective rate of rotation of each indoor fan among the plurality of indoor fans.

6. The air conditioner according to claim 5, wherein, the controller determines whether an amount of the refrigerant in a refrigeration cycle of the air conditioner is a predetermined amount, and controls the respective rate of rotation of each indoor fan among the plurality of indoor fans to be equal to each other upon determining that the amount of the refrigerant is the predetermined amount.

7. The air conditioner according to claim 4, further comprising an input to receive an operation mode input thereto,
   wherein the controller checks the flow rate of the refrigerant corresponding to the input operation mode, checks a reference rate of rotation corresponding to the checked flow rate of the refrigerant, sets the checked reference rate of rotation as a rate of rotation of an uppermost indoor fan among the plurality of indoor fans, and controls the other indoor fans among the plurality of indoor fans based on the checked reference rate of rotation such that each of the other indoor fans among the plurality of indoor fans has an increased rate of rotation.

* * * * *